United States Patent Office 3,076,018
Patented Jan. 29, 1963

3,076,018
PURIFICATION OF PHTHALATES BY
TREATMENT WITH PHOSPHITES
Delbert H. Meyer, Highland, and Mary M. Garvey, Hammond, Ind., assignors to Standard Oil Company, Chicago, Ill., a corporation of Indiana
No Drawing. Filed Nov. 3, 1958, Ser. No. 771,210
7 Claims. (Cl. 260—475)

This invention relates broadly to a process for the purification of terephthalic acid esters. More specifically the present invention relates to a process for removing color producing impurities from esters of a lower boiling alcohol and terephthalic acid. It especially concerns a process for the preparation of highly purified dimethylterephthalate and for the preparation of highly polymeric linear polyesters therefrom.

Processes for the production of linear super polyesters by the reaction of a dihydric alcohol with an aromatic dicarboxylic acid or its derivatives are well known. Especially important are the film- and fiber-forming super polyesters obtained commercially as the product of reaction of a glycol such as ethylene glycol with an ester of terephthalic acid as disclosed in U.S. Patent 2,465,319 of Whinfield and Dickson. Various other linear super polyesters have more recently become of significant commercial interest, for example, polyesters prepared by reaction of ethylene glycol with mixtures of terephthalic acid and isophthalic acid, which acids are also usually employed in the form of their dimethylesters.

In the commercial development of processes for the preparation of linear polyesters of the aforementioned type, for example polyethylene terephthalate, it has been found desirable to first carry out an ester interchange reaction between the ethylene glycol and dimethylterephthalate to form bis-2-hydroxyethyl terephthalate monomer which is then polymerized to polyethylene terephthalate under reduced pressure and at elevated temperatures. These polymers preferably are free of undesirable color, requiring the use of dimethylterephthalate which is itself free of any impurities capable of producing poor polymer color.

Heretofore no completely satisfactory method of obtaining high purity dialkylterephthalates free of color producing impurities has been known to the prior art. Dimethylterephthalate obtained by esterification of terephthalic acid with methanol can be refined by distillation at atmospheric or reduced pressure, or by recrystallization from suitable solvents. However, distillation even at reduced pressure often results in poor yields due to heat degradation, and can lead to considerable distillate of excessively high acidity which cannot be successfully employed in the polycondensation reaction with ethylene glycol. It has been further found that dimethylterephthalate obtained by careful fractional distillation and having satisfactory low acidity nevertheless contains undesirable color producing impurities.

Although the identity of the color producing impurities in dimethylterephthalate is not known with certainty, it is known that terephthalic acid produced by the oxidation of xylenes with nitric acid can be contaminated with nitrated and oxidized products, while terephthalic acid produced by air oxidation of xylenes can contain minor amounts of partially oxidized aromatic compounds as impurities. Although the usual methods of purification of terephthalic acid and of the dimethyl terephthalate prepared therefrom will remove a major portion of the impurities, trace amounts sufficient to contribute color producing properties to the dimethylterephthalate are difficult to remove entirely. The presence of these trace impurities can be shown by determining the color stability of dimethylterephthalate in the molten state over an extended period of time, suitably from 7 to 12 days as will hereinafter be more fully described.

An object of the present invention is to provide a process for the purification of dialkylesters of terephthalic acid. A further object is to provide a process for the purification of dimethylterephthalate. Another object is to provide a process for obtaining a refined dimethylterephthalate suitable for use in the manufacture of high molecular weight polyesters. Still another object is to provide an improved process for the distillation of dimethylterephthalate whereby high yields of refined product suitable for linear super polyester production is obtained. These and other objects will become apparent from the following description of our invention.

In its broadest aspects this invention contemplates purifying lower alkanol diesters of terephthalic acid by contacting such esters in the liquid state with a minor amount of a triaryl phosphite compound at elevated temperature between about 100° C. and about 300° C. and subsequently recovering the purified diester as a condensate. This invention particularly contemplates contacting molten dimethylterephthalate with a minor amount of a triaryl phosphite compound such as triphenyl phosphite and subsequently distilling the dimethylterephthalate to obtain a purified and heat stable product essentially free of phosphorus.

Our invention is to be clearly distinguished from known prior art processes in which triphenyl phosphite or other phosphorus containing additives are employed as color stabilizers by addition thereof to the dimethylterephthalate-ethylene glycol polycondensation reaction mixture. The incorporation of such additives in the polymerization reaction mass results invariably in increased reaction periods and in addition adversely effects the ultimate molecular weight of the polymer produced. It is an essential feature of our invention that the purified dimethylterephthalate produced thereby be substantially free of phosphorus containing compounds. The purified dimethylterephthalate obtained by the process of our invention therefor contains substantially less than 0.05% and preferably less than 0.01% triaryl phosphite.

It is a surprising feature of our invention that treatment of dimethylterephthalate with a triaryl phosphite compound not only results in a distilled product substantially free of color-forming impurities, but that the yield of desirable low acid number distillate is substantially increased. It is generally recognized in the art that low acidity is an essential requirement of dimethylterephthalate which is to be employed for the preparation of linear super polyesters by reaction with dihydric alcohols. Generally, acid numbers (mg. KOH required to neutralize one gram of sample) greater than 0.05 will adversely affect the quality, especially the molecular weight, of the condensation polymer produced. We have found that the process of our invention not only gives a remarkably heat stable product, but that a substantially greater percentage of distillate can be obtained (in the purification of dimethylterephthalate) having an acid number below this critical value. Our process is of great economic value, therefore, in improving the yield of pure dimethylterephthalate which is obtainable by distillation of the crude or partially purified diester.

It will be apparent to those skilled in the art, that the remarkable heat stability of the dialkylterephthalates prepared by the process of our invention offers desirable advantages in addition to improvement in the color of linear super polyesters prepared therefrom. For example, dimethylterephthalate is a solid at room temperature (M.P. 140.6° C.) and is ordinarily shipped in commerce in the form of solid flakes or powder. Numerous advantages would accrue, however, if shipment in the molten form were possible. For example, distilled dimethylterephthalate could be pumped directly to heated tank cars, and elimination of the need for cooling, flaking and bagging the product would effect a considerable economic advantage. Because of the extraordinary heat stability of the product obtained as herein described, commercial shipment in the molten state becomes feasible, since the purified dimethylterephthalate remains colorless even though maintained in the molten state for an extended period of time.

According to this invention, impure molten dimethylterephthalate is treated with a effective amount of a triaryl phosphite compound such as triphenyl phosphite, at a temperature below about 300° C. and subsequently distilled to obtain substantially pure dimethylterephthalate. The quantity of the treating agent required is minor but will, of course, be dependent upon the source and purity of the starting material employed.

While we prefer to mix the dimethylterephthalate and the treating agent, and then to subject the mixture to a distillation step for the recovery of the desired product, we may also feed the impure dimethylterephthalate and/or the triphenyl phosphite treating agent continuously to a distillation column equipped with a reboiler and a condenser. Desirably the impure dimethylterephthalate is fed into the column at a point in the central portion thereof. Triphenyl phosphite, or other triaryl phosphite having a boiling point greater than that of dimethylterephthalate is fed continuously into the column together with the DMT or alternatively at a point above the point of introduction of the impure ester. During the process, part of the material is removed continuously from the reboiler and introduced into the column admixed with the impure DMT. Substantially, pure dimethylterephthalate is taken off overhead from the condenser. A portion of the material which collects in the reboiler is withdrawn, batchwise or continuously and discarded; fresh triphenyl phosphite is added to make up for that portion so removed.

In the practice of the present invention, molten dimethylterephthalate is admixed with a minor amount of a triaryl phosphite such as triphenyl phosphite and maintained at a temperature between about 150° C. and about 300° C., preferably between about 150° and 250° C. for a period from about ¼ hour up to about 12 hours. The pure DMT is then recovered by distillation from the mixture. Generally, the addition of from 0.01 to 10%, preferably 0.05 to 1% by weight of triaryl phosphite proves satisfactory. The amount of treating agent used will depend upon the purity of the starting material employed.

The mixture of DMT and treating agent can be refluxed prior to distillation if desired at atmospheric or sub-atmospheric pressure. The mixture can be refluxed for from about 0.1 to about 12 hours, or longer. Longer periods of refluxing than indicated may be used without harmful result, and shorter periods will also prove beneficial.

Following the contacting step, the solution is subjected to fractional distillation at atmospheric, sub-atmospheric or super atmospheric pressure to recover the ester in the impurity-free, heat stable form, essentially free of any phosphorus contaminant. In the preferred practice of the invention, distillation is conducted under vacuum, for example, at pressures below about 100 mm. Hg, lower distillation temperatures resulting in product of improved color with concomitant savings in heat requirement being thereby obtained. Preferably, the initial portion of the distillate is recovered separately and discarded or recycled to the purification step, this fraction generally containing minor amounts of impurities and/or color. Preferably also, the latter portion of the distillate is discarded or recycled for further treatment.

By operating in this manner, high yields of high quality dimethylterephthalate having remarkable heat stability can be obtained, and the distilled product so obtained is substantially free of any phosphorous containing compounds.

In order to more clearly illustrate the advantage of our invention, we offer the following specific examples of the practice thereof.

EXAMPLE 1

Dimethylterephthalate (prepared by esterification of terephthalic acid which had been obtained by liquid phase air oxidation of p-xylene) was charged to a distillation flask fitted with a 20 tray "Oldershaw" column. The flask contents were refluxed at a pot temperature of 200° C. and a pressure of 80 mm. Hg for 4 hours until equilibrium conditions were established, and then fractions taken overhead while maintaining the reflux ratios indicated in the table. The distillation was stopped when the vapor temperature reached 203° C.

The results of two distillations conducted in this manner are given in Table I. In run #1, 2720 g. of dimethylterephthalate was charged to the distillation flask. In run #2, 2720 g. of the same batch of dimethylterephthalate plus 18 g. triphenyl phosphite were charged to the distillation flask.

*Table I*

| Fraction | Run #1 | | | | | Run #2 | | | | |
|---|---|---|---|---|---|---|---|---|---|---|
| | Pot temp., °C. | Vapor temp., °C. | Reflux ratio | Grams | Acid No. | Pot temp., °C. | Vapor temp., °C. | Reflux ratio | Grams | Acid No. |
| 1 | 209 | 204 | 10/1 | 108 | 0.19 | 210 | 202 | 10/1 | 148 | [1] 0.03 |
| 2 | 210 | 204 | 5/1 | 134 | 0.17 | 209 | 202 | 5/1 | 220 | 0.03 |
| 3 | 210 | 204 | 1/1 | 200 | 0.10 | 209 | 202 | 1/1 | 226 | 0.02 |
| 4 | 210 | 204 | 1/1 | 558 | 0.02 | 209 | 203 | 1/1 | 520 | 0.01 |
| 5 | 218 | 206 | 1/1 | 526 | 0.01 | 209 | 203 | 1/1 | 545 | 0.02 |
| 6 | 227 | 206 | 5/1 | 332 | 9.01 | 210 | 203 | 1/1 | 592 | 0.02 |
| 7 | 260 | 206 | 5/1 | 316 | 0.02 | 232 | 201 | 1/1 | 221 | 0.02 |
| 8 | 260 | 206 | 10/1 | 168 | 0.03 | | | | | |
| Residue | | | | ca. 370 | | | | | ca. 240 | |

[1] Slight yellow color.

From Table I it will be seen that distillation of dimethylterephthalate in the absence of any added material resulted in a total distillate of satisfactory acid number (less than 0.05) of 70% (fractions 4-8 inclusive) by weight of material charged. Distillation in the presence of added triphenyl phosphite yielded 86% (fractions 2-7 inclusive) of high purity, colorless product. This latter yield does not include fraction 1, which was discarded because of a slight yellow color, even though the acid number was less than the required maximum. Analysis of combined fractions 2-7 inclusive of run #2 indicated that the distillate was free of phosphorus (limit of detectability—0.002% P).

The color stability of the distilled product obtained as described above was determined by subjecting a portion of Fraction No. 4 in each case to a color stability test as follows. A 60 g. sample of the distillate was placed in a glass tube inserted in a thermostatic bath maintained at a temperature of 175° C.±3° C. The color was determined initially or as indicated by comparison with standard APHA sample tubes (American Public Health Association).

MOLTEN COLOR AT 175° C.

| Fraction #4, run | Initial | 1 day | 7 days |
|---|---|---|---|
| 1 | 15 | 45 | 400 |
| 2 | 25 | 25 | 20 |

EXAMPLE 2

Similarly, four distillations of dimethylterephthalate were effected through a 20 tray "Oldershaw" column. In runs 3 and 4, the dimethylterephthalate employed was obtained by esterification of terephthalic acid prepared by air oxidation of mixed xylenes. In runs 5 and 6, terephthalic acid obtained by air oxidation of para-xylene was employed for preparation of the dimethylester. Runs 4 and 6 were conducted in the presence of triphenyl phosphite, 9.55 g. of the phosphite being added to 2720 g. of dimethylterephthalate prior to distillation. In each case distillation was effected under vacuum at 80 mm. Hg pressure, the charge being refluxed for 4 hours prior to commencing distillation. All distillate boiling between 203° C. and 207° C. (vapor temperature) and having an acid number less than 0.05 was collected as "heart cut."

*Table II*

| Run No | 3 | 4 | 5 | 6 |
|---|---|---|---|---|
| Source of T.A | mixed xylenes | mixed xylenes | para-xylene | para-xylene |
| Charge: | | | | |
| DMT, g | 2,720 | 2,720 | 2,720 | 2,720 |
| Triphenyl Phosphite, g | | 9.55 | | 9.55 |
| Heart Cut: | | | | |
| Yield (Percent of Charge) | 74 | 87 | 71 | 77 |
| Acid No. (mg. KOH/g.) | 0.01 | 0.03 | 0.03 | 0.03 |
| Freezing Pt | 140.60 | 140.61 | 140.60 | 140.62 |
| Molten Color, (175° C.) APHA— | | | | |
| Initial | 15 | 15 | 10 | 10 |
| 3 Days | 15 | 25 | 150 | 10 |
| 7 Days | 200 | 30 | 500 | 20 |
| Percent Phosphorus [1] | None | None | None | None |

[1] Limit of detectability—0.002%.

As will be apparent from the above data, the process of our invention permits the obtention of a pure, heat-stable dimethylterephthalate of excellent acid number in high yield. The product which was obtained by distillation over triphenyl phosphite was employed as a reactant in a polycondensation reaction with ethylene glycol and polyethylene terephthalate obtained therefrom had excellent color, high viscosity and melting point above 250° C.

While the heat stability of dimethylterephthalate can be improved by the addition thereto of triphenyl phosphite, it was found that incorporation of at least 0.1% of triphenyl phosphite in the "heart cut" distillate of run #5 was necessary to obtain heat stability comparable to that of the product of run #6. The addition of triphenyl phosphite in this manner to the distillate adversely affected the quality, especially the viscosity, of polyethylene terephthalate produced therefrom.

EXAMPLE 3

In like manner 2720 g. of DMT was distilled in the presence of 10 ml. of "Polyguard" (an alkylated aryl phosphite). A distillate yield of 85% of material charged having an acid number less than 0.05 was obtained, and this product had a 7-day molten color (175° C.) of 30 APHA. The product had a phosphorus content of less than 0.002 p.p.m.

While our invention has been particularly illustrated by means of examples employing dimethylterephthalate, it will be clear that other esters of terephthalic acid can be similarly purified. Thus, diesters of terephthalic acid with a lower alkanol having from 2 to 8 carbon atoms in the molecule, for example, diethyl, dipropyl, dibutyl, dioctyl, and the like can be subjected to the purification process of our invention. Our process is of particular value in the purification of dimethylterephthalate since this ester is most frequently employed for the preparation of linear super polyesters.

Various triaryl phosphite compounds can be employed as treating agents in the process of our invention. Especially valuable are triphenyl phosphite and alkylated triphenyl phosphites wherein one or more of the phenyl groups contain an alkyl substituent of 1 to 8 carbon atoms. It will be appreciated that in the treatment of high boiling terephthalic acid esters with these reagents, proper selection of the treating agent with a view toward separation thereof from the purified ester is necessary. Thus, the triaryl phosphite employed should have a boiling point sufficiently above that of the treated ester to enable ready separation thereof by fractional distillation.

Alternatively, the treated ester after contacting with the phosphorus-containing compound, can be separated therefrom by crystallization of the mixture from an appropriate solvent, and the phosphorus-free diester subsequently distilled to obtain a product of desirable high purity and heat stability.

We claim:

1. A method for improving the heat stability of a dialkylester of terephthalic acid and a lower alkanol which comprises contacting said diester in the molten state after esterification with a triaryl phosphite at an elevated temperature between about 150° and 250° C. for a period from about one-quarter hour up to about 12 hours and recovering said diester as a condensate having substantially improved heat stability.

2. The method of claim 1 wherein the triaryl phosphite is present in an amount of from about 0.01 to about 10 percent by weight of the diester.

3. The method of claim 1 wherein said diester is an ester of a lower alkanol having from 1 to 8 carbon atoms in the molecule.

4. A method for improving the heat stability of dimethylterephthalate which comprises contacting molten dimethylterephthalate after esterification with from .01 to about 10 percent by weight of a triaryl phosphite at a temperature between about 150° and 250° C. for a period from about one-quarter hour up to about 12 hours and recovering dimethylterephthalate as a condensate substantially free of phosphorus and having substantially improved heat stability.

5. The process of claim 4 wherein the triaryl phosphite is triphenyl phosphite.

6. The process of claim 4 wherein the triaryl phosphite is a tri (alkaryl) phosphite.

7. A method for improving the heat stability of dimethylterephthalate which comprises heating molten dimethylterephthalate after esterification in the presence of from 0.05 to about 1.0 percent by weight of triphenyl phosphite for a period of 0.1 to about 12 hours at subatmospheric pressure and at a temperature between about 150° and 250° C. and fractionally distilling dimethylterephthalate therefrom so as to obtain a distillate substantially free of phosphorus and having substantially improved heat stability.

References Cited in the file of this patent

UNITED STATES PATENTS

| 2,612,515 | Hudson et al. | Sept. 30, 1952 |
| 2,862,021 | Bille et al. | Nov. 25, 1958 |
| 2,912,457 | Blaser et al. | Nov. 10, 1959 |

FOREIGN PATENTS

| 676,553 | Great Britain | July 30, 1952 |
| 791,283 | Great Britain | Feb. 26, 1958 |